United States Patent Office 3,488,407
Patented Jan. 6, 1970

3,488,407
CYCLIC ESTERS OF PHOSPHORUS
William L. Schall, Buffalo, and James J. Hodan, Williamsville, N.Y., assignors to Hooker Chemical Corporation, Niagara Falls, N.Y., a corporation of New York
No Drawing. Filed Nov. 26, 1965, Ser. No. 510,027
Int. Cl. C07d *105/04;* C08d *11/04;* C08f *45/58*
U.S. Cl. 260—927                    7 Claims

ABSTRACT OF THE DISCLOSURE

Cyclic diphosphites of the formula

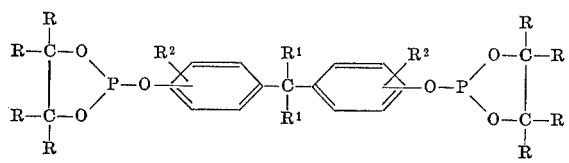

a method of manufacture thereof by reaction of a cyclic phosphorohalidite and a bisphenol in the presence of an acid acceptor, and polymers incorporating the described compounds, as stabilizers therein. In the formula given, R is either hydrogen, lower alkyl or halogen, R¹ is either hydrogen or alkyl and R² is either hydrogen, alkyl or halogen.

---

This invention relates to novel cyclic diphosphites and a process for the preparation thereof. More particularly, it relates to the preparation of novel bis[(1,3,2-dioxaphospholanyl-2-oxyl)aryl]alkanes.

It is an object of this invention to prepare novel cyclic diphosphites. Another object is to prepare novel cyclic diphosphites exhibiting stabilizing properties in rubber and similar compositions. These and other objects will become apparent to those skilled in the art from the following detailed description.

The cyclic phosphorus compounds of this invention may be characterized by the following structural formula:

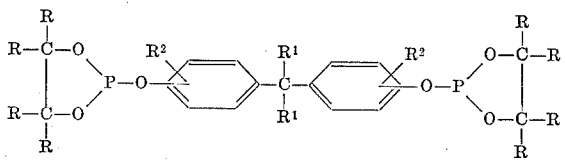

wherein R is independently selected from the group consisting of hydrogen, alkyl of 1 to 6 carbon atoms, preferably of 1 to 4 carbon atoms, and halogen, preferably chlorine or bromine; R¹ is selected from the group consisting of hydrogen and alkyl of 1 to 12 carbon atoms, preferably from 1 to 6 carbon atoms; and R² is independently selected from the group consisting of hydrogen, alkyl of 1 to 12 carbon atoms, preferably of 1 to 4 carbon atoms, and halogen, preferably chlorine or bromine.

The compounds thus contain at least two 1,3,2-dioxaphospholanyl radicals represented and numbered as follows:

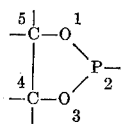

Typical examples of the compounds of the invention are bis[4′ - (1,3,2 - dioxaphospholanyl - 2 - oxy)phenyl] methane also known as diethylene bisphenol-F diphosphite, bis[3′ - (1,3,2 - dioxaphospholanyl - 2 - oxy) phenyl]methane, bis[2′ - (1,3,2 - dioxaphospholanyl-2-oxy)phenyl]methane, bis 2,2-[4′ - (1,3,2 - dioxaphospholanyl - 2 - oxy)phenyl]propane, bis[4′ - (1,3,2 - dioxaphospholanyl - 2 - oxy)chlorophenyl]methane, bis 2,2 - [4′ - (1,3,2 - dioxaphospholanyl - 2 - oxy)bromophenyl]propane, bis[4′-(1,3,2 - dioxaphospholanyl-2-oxy) methylphenyl]methane, bis 2,2 - [2′ - (1,3,2 - dioxaphospholanyl - 2 - oxy)nonylphenyl]propane, bis[4′ - (1,3,2-dioxaphospholanyl - 2 - oxy)octylphenyl]methane, and the like.

In accordance with the invention, the novel compounds of the invention are prepared by a process which comprises reacting a cyclic phosphorohalidite with a dihydroxy organic compound, in the presence of a halogen acid acceptor, and recovering the desired cyclic diphosphite.

The cyclic phosphorohalidites utilized in the preparation of the compounds of the invention have the following formula:

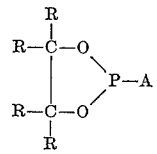

wherein R is as previously mentioned and A is halogen, preferably chlorine or bromine. Typical examples of the compounds characterized above are 2 - chloro - 1,3,2-dioxaphospholane, also known as ethylene phosphorochloridite, 2 - bromo - 1,3,2 - dioxaphospholane, 2-chloro-4 - ethyl - 1,3,2 - dioxaphospholane, 2 - chloro - 4,4 - dimethyl - 1,3,2 - dioxaphospholane, 2 - chloro - 4,4,5-triethyl - 1,3,2 - dioxaphospholane, 2 - chloro - 4,5 - dimethyl - 1,3,2 - dioxaphospholane, 2 - chloro - 4,5 - dimethyl - 1,3,2 - dioxaphospholane, 2 - chloro - 4,5 - diethyl - 1,3,2 - dioxaphospholane, 2 - chloro - 4 - methyl-1,3,2 - dioxaphospholane, 2 - bromo - 4,4,5 - triethyl-1,3,2 - dioxaphospholane, 2 - bromo - 4,5 - dimethyl-1,3,2 - dioxaphospholane, and the like. These compounds may be prepared by reacting the appropriate glycol with a phosphorus trihalide.

The dihydroxy organic compounds which may be reacted with the phosphorohalidite have the formula:

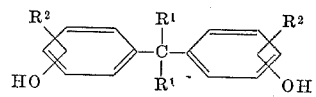

wherein R¹ and R² are as previously mentioned. Examples of the dihydroxy organic compounds characterized above, which may also be referred to as dihydroxy phenolic compounds, are 2,2 - bis(4 - hydroxyphenyl)propane, also known as bisphenol-A, bis(4 - hydroxyphenyl)-methane, also known as bisphenol-F, 2,2 - bis(4 - hydroxyphenyl)butane, bis(2,4′ - hydroxyphenyl)methane, 2,2 - bis(2 - hydroxyphenyl)propane, bis(3 - hydroxyphenyl)methane, bis(2 - hydroxyphenyl)methane, bis(2-chloro - 4 - hydroxyphenyl)methane, 2,2 - bis(2 - bromo-4 - hydroxyphenyl)propane, bis(2 - methyl - 4 - hydroxyphenyl)ethane, bis(2 - nonyl-4-hydroxyphenyl)methane, bis(2 - octyl - 4 - hydroxyphenyl)methane, and the like.

As acid acceptors for the removal of the halogen acid formed in the reaction, compounds such as triethylamine, tributylamine, tripropylamine, pyridine, dimethylaniline, and the like, may be effectively utilized. If desired, a solvent such as tetrahydrofuran, toluene, ether, pentane, or the like, may be utilized in combination with the other reactant.

The reaction between the cyclic phosphorohalidite and the dihydroxy organic compound may be effected at temperatures ranging from −10 degrees centigrade to 100 degrees centigrade. It is preferred to employ temperatures ranging from 20 degrees centigrade to 50 degrees centigrade. The reaction may be carried out at atmospheric pressure; however, it, preferred, pressures either higher or lower than atmospheric may be employed.

Relative amounts of reactants employed are not critical. However, it may be desirable to avoid an excess of hydroxy reactant. Thus, generally, the reactants are present in the reaction mixture in stoichiometric proportions of a molar proportion of dihydroxy compound and two molar proportions of the cyclic phosphorohalidite. The acid acceptor may be employed in any convenient amount, preferably in amounts which are equal to or in excess of stoichiometric amounts. Thus, a molar proportion of acid acceptor, based upon cyclic phosphorohalidite employed, may be conveniently utilized.

In conducting the reaction, the reactants and halogen acceptor may be simultaneously charged to the reaction vessel. However, in view of the fact that in some instances the reaction may tend to be violent, it is preferred to control the reaction and also regulate the temperature by slow addition of one of the reactants, namely, the phosphorohalidite, to the total amount of the other components of the reaction. Reaction times may vary but generally times in the range of one to eight hours are sufficient to complete the reaction.

The reaction mixture may be worked up in any siutable manner, for instance, the solid constituents of the mixture may be removed by filtration. If a solvent is employed in the reaction, it may be removed by distillation, evaporation, or by any other suitable method. Because of the high yields which are in many cases obtainable, separation of the desired cyclic diphosphite, following filtration and solvent removal is not always required for utility of the product and in such cases may be dispensed with. However, if separation is desired, techniques such as distillation, extraction, crystallization, or the like, may be employed.

The compounds of the invention find utility as stabilizers for synthetic rubber and chlorinated polymer, particularly as antioxidants for synthetic rubber.

The following examples are presented to illustrate the novel compounds of this invention and their preparation and utility. It is to be understood that these examples are not to be construed as limiting the invention, except as defined in the appended claims. All temperatures are in degrees centigrade and all parts are by weight, unless otherwise indicated.

EXAMPLE 1

Preparation of diethylene bisphenol-F diphosphite

A three-necked round bottom flask equipped with nitrogen dropping funnel, paddle stirrer, heating mantle, thermometer and condenser was charged with 908 parts of ether solvent, 162 parts of bis(4-hydroxyphenyl)methane (.83 molar proportion) and 132 parts of pyridine (1.67 molar proportions). Ethylene phosphorochloridite, 200 parts (1.85 molar proportions), was added through a dropping funnel at a rate which caused the ether solvent to reflux. Temperature of said reflux was in the range of 35 to 40 degrees centigrade. Following the addition of ethylene phosphorochloridite, the reaction was refluxed for an additional one hour and 30 minutes. The amine hydrochloride salt which was formed during the reaction was filtered and ether solvent stripped to a pot temperature of 80 degrees centigrade at 7 millimeters of mercury absolute pressure. The residue product was obtained in 90 percent yield. The product was found to contain 16 percent of phosphorus. The theoretical amount of phosphorus in diethylene bisphenol-F diphosphite is 16.3 percent phosphorus. The infrared analysis was consistent for points of structure such as aliphatic CH bonds, aromatic CH bonds, aryl —O—P bonds and aliphatic —O—P bonds.

Upon replacement of the bis(4-hydroxyphenyl)methane in the above example by equimolar quantities of bis(3-hydroxyphenyl)methane, bis(2 - hydroxyphenyl)methane, bis(2 - chloro-4-hydroxyphenyl)methane, 2,2 - bis(2 - hydroxyphenyl)propane, bis(2-methyl - 4 - hydroxyphenyl)ethane or bis(2,4' - hydroxyphenyl)methane, the corresponding diphosphites are obtained.

Similarly, when the ethylene phosphorochloridite above is replaced by equimolar quantities of 2-chloro-4-ethyl-1,3,2-dioxaphospholane, 2 - bromo-4,5-dimethyl-1,3,2-dioxaphospholane, 2 - chloro-4,4-dimethyl-1,3,2-dioxaphospholane, or 2-chloro-4,4,5-triethyl-1,3,2-dioxaphospholane, the corresponding diphosphites are obtained.

As previously stated, the novel compounds of the invention are useful as stabilizers for synthetic rubber and chlorinated polymers. They can, for example, be used for stabilizing (a) polymers derived from conjugated diolefines, such as butadiene, dimethyl butadiene, isoprene and homologues thereof; (b) copolymers of conjugated diolfines and polymerizable vinyl compounds, such as styrene, α-methyl styrene, acrylonitrile, acrylates of methacrylates; (c) copolymers derived from iso-olefines (e.g., isobutylene or its homologues) and small quantities of conjugated diolefines; (d) polymers derived from chlorobutadiene; and (e) copolymers of chlorobutadiene with mono-olefines and/or diolefines or polymerizable vinyl compounds. Examples of chlorine-containing polymers are polymers of vinyl chloride or vinylidene chloride and copolymers of these compounds with 2-chlorobutadiene or vinyl acetate, also chlorinated rubber or sulpho-chlorinated polyethylene. The new stabilizers can be admixed with the synthetic rubber latex or with rubber solutions and also with the solid rubber or the solid chlorine-containing polymers (for example, on a roller). In certain circumstances they can also be admixed with the monomers prior to polymerization. The stabilizers of this invention should be employed in effective stabilizing amounts such as of from 0.1 percent to 10 percent by weight, based on the weight of synthetic polymer. Amounts of stabilizer of from 0.1 percent to 5 percent, and especially from 0.1 percent to 1.5 percent, are particularly preferred. They impart to synthetic rubber and to chlorine-containing polymers excellent stability to oxidizing agents, heat, light and discoloration. At the same time they are compatible with additives, such as plasticizers and fillers.

Accordingly, another aspect of the invention is the preparation of stabilized polymeric compositions comprising a polymer selected from the group consisting of homopolymers of conjugated diolefins, copolymers of conjugated diolefins and polymerizable vinyl monomers, homopolymers of chlorobutadiene, copolymers of chlorobutadiene and a monomer selected from the group consisting of an olefin, a diolefin, vinyl chloride and vinylidene chloride, polyvinyl chloride, polyvinylidene chloride, and chlorinated natural rubber, stabilized by incorporating therein 0.1 percent to 10 percent, based on the weight of polymer of a cyclic phosphite of the formula:

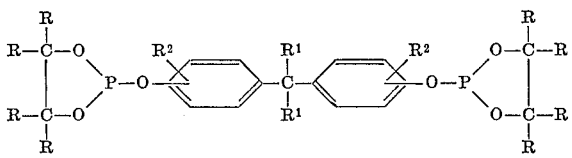

wherein R, $R^1$ and $R^2$ are as previously mentioned.

EXAMPLE 2

GR–S rubber crumb was prepared by diluting 2,955 parts of unstabilized 1502 rubber latex (mixed rosin and fatty acid, cold butadiene-styrene latex, wherein the rubber hydrocarbon contains 23.5 percent bound styrene) containing approximately 20 percent rubber hydrocarbon with 3,000 parts of water and thereafter adding a solution of 75 parts of sodium chloride dissolved in 700 parts of water to cream the latex. The mixture was heated to and maintained at 49 degrees centigrade, and 3,031 parts of 2 percent sulfuric acid were added in divided portions with stirring. The formed rubber crumb was digested for 15 minutes at 49 degrees centigrade, cooled to room temperature and washed with water until free of chlorine ion, as detected by the silver nitrate test. The rubber crumb was dried to a constant weight employing a circulating oven at 65.5 degrees centigrade.

EXAMPLE 3

This illustrates the stabilizing properties of the novel phosphites of the invention in synthetic rubber mixtures.

Several different test samples, as shown hereinafter at Table I, were prepared employing mixtures of 75 parts of the dried butadiene-styrene crumb of Example 2 and 1.2 parts of a phosphite stabilizer of this invention. Each mixture was milled with blending on an unheated two roll mill until uniform quarter inch thick sheets were obtained. Each sheet was cut into strips which were placed into a circulating oven maintained at 130 degrees centigrade. At various intervals samples of each mixture were withdrawn and checked for resinification and phenolic odor. A control containing no phosphite was also prepared and tested. The results obtained during the testing are shown at Table I appearing below.

TABLE I

| Sample | Stabilizer | Resinification after exposure to 130 degrees centigrade for— | | | | |
|---|---|---|---|---|---|---|
| | | 1 hour | 3 hours | 6 hours | 8 hours | 12 hours |
| I | Diethylene bisphenol-F diphosphite (bis[4'-(1,3,2-dioxaphospholanyl-2-oxy)phenyl]-methane. | None | None | None | None | None |
| II | Tris(nonylphenyl)phosphite | do | Slight | Severe | | |
| III | Blank | Slight | Severe | | | |

Resinification is defined as the surface cracking of a stretched polymer film previously exposed to heat whereby a melted surface film was produced.

When bis[4'-(1,3,2-dioxaphospholanyl - 2 - oxy)chlorophenyl]methane, bis[3'(1,3,2 - dioxaphospholanyl-2-oxy) phenyl]methane, bis[2'-(1,3,2-dioxaphospholanyl-2-oxy) phenyl]methane, bis[4'-(1,3,2-dioxaphospholanyl-2-oxy) methylphenyl]methane or bis[4' - (1,3,2 - dioxaphospholanyl-2-oxy)octylphenyl]methane is used as the stabilizer or antioxidant in Example 3, results corresponding to those of Table I are obtained.

EXAMPLE 4

0.375 part of diethylene bisphenol-F diphosphite (bis[4'-(1,3,2-dioxaphospholanyl-2-oxy)phenyl]methane) is admixed with a mixture of 75 parts of polyvinyl chloride, 33.7 parts of dioctyl phthalate and .375 part of barium-cadmium laurate. Specimens of the mixture are heated in an oven at 170 degrees centigrade. A control containing no diphosphite is also prepared. The control is strongly discolored after 30 minutes, while the specimen containing the diphosphite is weakly discolored after one hour of heating.

When 0.375 part of bis[3'-(1,3,2-dioxaphospholanyl-2-oxy)phenyl]methane, bis[2'-(1,3,2-dioxaphospholanyl-2-oxy)phenyl]methane, bis[4'-(1,3,2-dioxaphospholanyl-2-oxy)methylphenyl]methane or bis[4'-(1,3,2 - dioxaphospholanyl-2-oxy)chlorophenyl]methane is used as the additive, similar results are obtained.

Further, upon replacement of the butadiene-styrene rubber in Example 3 by a copolymer of chlorobutadiene and a monomer selected from the group consisting of an olefin, a diolefin, vinylchloride and vinylidene chloride, results corresponding to those of Table I are obtained.

What is claimed is:

1. A compound of the formula:

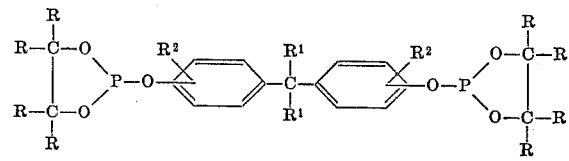

wherein R is independently selected from the group consisting of hydrogen, alkyl of 1 to 6 carbon atoms, chlorine and bromine, $R^1$ is independently selected from the group consisting of hydrogen and alkyl of 1 to 12 carbon atoms, and $R^2$ is independently selected from the group consisting of hydrogen, alkyl of 1 to 12 carbon atoms, chlorine and bromine.

2. A compound in accordance with claim 1 wherein $R^2$ is hydrogen.

3. A compound in accordance with claim 2 wherein $R^1$ is hydrogen.

4. A compound in accordance with claim 2 wherein $R^1$ is alkyl.

5. A compound in accordance with claim 3 wherein R is hydrogen.

6. Bis[4'-(1,3,2 - dioxaphospholanyl - 2 - oxy)phenyl] methane.

7. A compound in accordance with claim 4 wherein R is hydrogen.

References Cited

UNITED STATES PATENTS 2,841,608   7/1958   Hechenbleikner et al.   260—927

CHARLES B. PARKER, Primary Examiner

R. L. RAYMOND, Assistant Examiner

U.S. Cl. X.R.

260—45.8, 619, 937, 973